United States Patent
Yoshida

(10) Patent No.: US 9,190,107 B2
(45) Date of Patent: Nov. 17, 2015

(54) INFORMATION RECORDING DEVICE AND INFORMATION RECORDING METHOD

(71) Applicant: Kabushiki Kaisha Toshiba, Tokyo (JP)

(72) Inventor: Osamu Yoshida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 239 days.

(21) Appl. No.: 13/779,491

(22) Filed: Feb. 27, 2013

(65) Prior Publication Data

US 2014/0115247 A1 Apr. 24, 2014

(30) Foreign Application Priority Data

Oct. 18, 2012 (JP) .................................. 2012-231075

(51) Int. Cl.
| | | |
|---|---|---|
| *G11C 11/406* | (2006.01) | |
| *G11B 20/18* | (2006.01) | |
| *G11B 5/012* | (2006.01) | |
| *G11B 20/12* | (2006.01) | |

(52) U.S. Cl.
CPC ............ *G11B 20/1833* (2013.01); *G11B 5/012* (2013.01); *G11B 2020/1298* (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS

| | | | |
|---|---|---|---|
| 5,889,933 A * | 3/1999 | Smith ............................. 714/22 |
| 6,721,863 B1 * | 4/2004 | Endo ............................. 711/165 |
| 6,732,290 B1 * | 5/2004 | Perry et al. .................... 714/6.22 |
| 7,173,782 B2 * | 2/2007 | Ikeda et al. ...................... 360/31 |
| 2001/0010603 A1 * | 8/2001 | Uzumaki et al. ................. 360/31 |
| 2001/0052062 A1 * | 12/2001 | Lipovski ......................... 712/32 |
| 2010/0014183 A1 * | 1/2010 | Aoki et al. ....................... 360/71 |
| 2010/0058145 A1 * | 3/2010 | Yoshida ......................... 714/764 |
| 2012/0099389 A1 * | 4/2012 | Park et al. ..................... 365/200 |
| 2012/0166714 A1 * | 6/2012 | Mun et al. ...................... 711/103 |
| 2013/0212330 A1 * | 8/2013 | Brittain et al. ................. 711/106 |

FOREIGN PATENT DOCUMENTS

| | | |
|---|---|---|
| JP | 2008-077669 | 4/2008 |
| JP | 2010-182406 | 8/2010 |

* cited by examiner

*Primary Examiner* — Jared Rutz
*Assistant Examiner* — Jean Edouard
(74) *Attorney, Agent, or Firm* — Patterson & Sheridan, LLP

(57) ABSTRACT

An information recording device includes a recording medium in which renewal data, which is a target of a data refresh operation, is recorded, a reading module that reads the renewal data recorded in the recording medium, a renewal module that performs updating of a value indicating a state of the data refresh operation, a generation module that generates parity data based on the value and the read renewal data, and a recording module that records the renewal data after recording the generated parity data.

20 Claims, 4 Drawing Sheets

Fig. 3A

Before Starting

| Target Track Group | AAA |
|---|---|
| Time Information | ###1 (4Byte) |

Fig. 3B

After Completing

| Target Track Group | AAA |
|---|---|
| Time Information | 0000 (4Byte) |

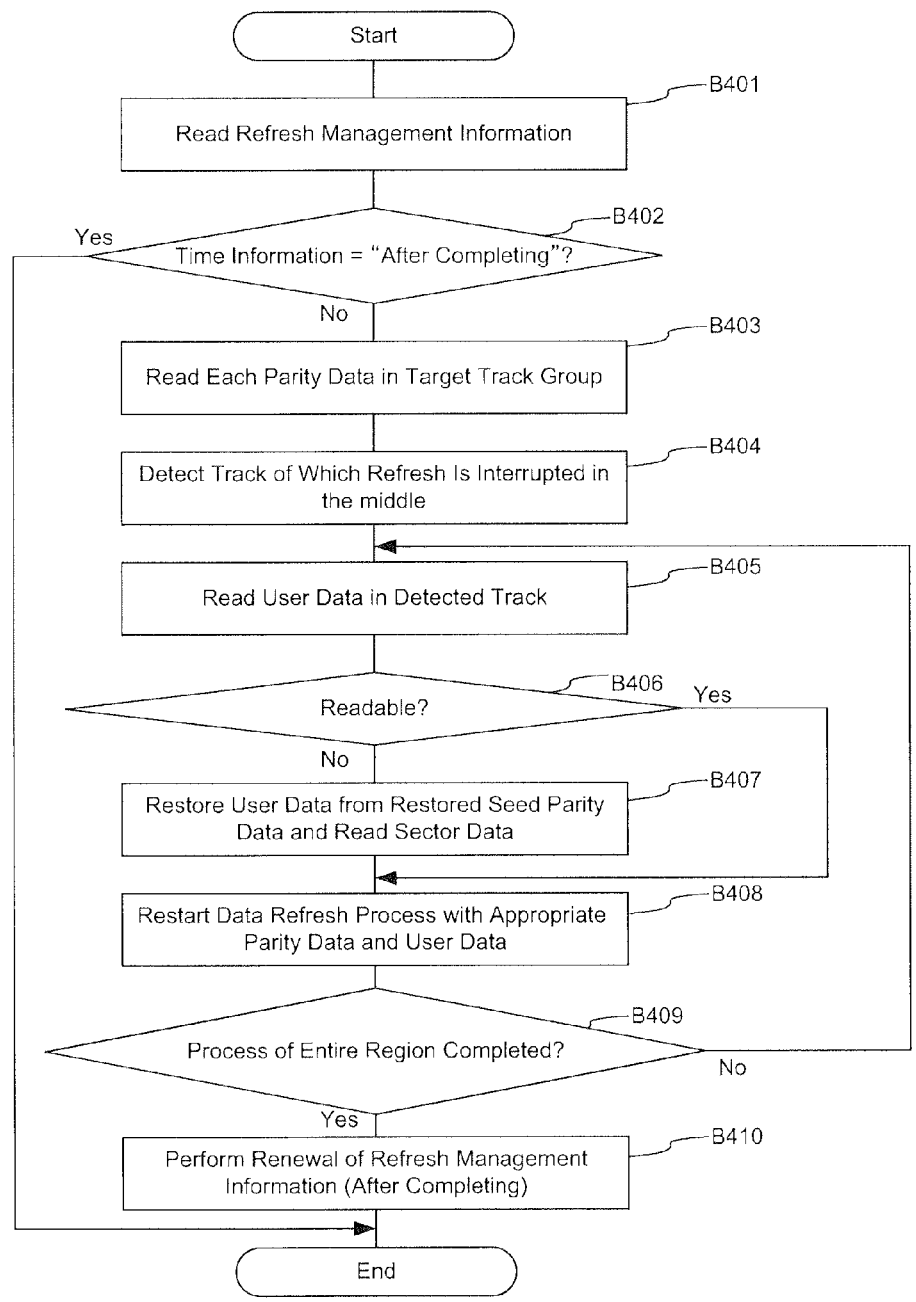

INFORMATION RECORDING DEVICE AND INFORMATION RECORDING METHOD

CROSS-REFERENCE TO RELATED APPLICATION(S)

This application is based upon and claims the benefit of priority from Japanese Patent Application No. 2012-231075, filed on Oct. 18, 2012, the entire contents of (if multiple applications, all of) which are incorporated herein by reference.

FIELD

The present application relates to an information recording device that records information in a recording medium and an information recording method.

BACKGROUND

In recent years, a technology of rewriting (i.e., renewing or refreshing) recorded information is applied to an information recording device such as a hard disk drive (HDD) and a solid state drive (SSD) in order to maintain quality of information recorded in a recording medium of the information recording device. Major factors that require rewriting of information in the recording medium are, for example, magnetic interference due to recording in an adjacent track in a HDD and data retention in a SSD.

In a HDD, when it is determined that magnetic interference due to recording in an adjacent track has occurred, a process that is called data refresh is performed. It is common in the data refresh process to read recorded information, temporarily record the read information in a retraction track, and rewrite back in the track in which the read information has been originally recorded.

Temporary data recording in a retraction track is to prepare for process interruption of a HDD during performance of the data refresh process due to a loss of power source, etc. Therefore, process time of the data refresh process is lengthened due to the temporary data recording in the retraction track.

However, generally the data refresh process is undesirably time-consuming.

BRIEF DESCRIPTION OF THE DRAWINGS

FIG. 3A and FIG. 3B are drawings for explaining management information related to the data refresh process according to the embodiment.

FIG. 4 is a flow diagram for explaining an operation of a resume process of the stopped data refresh process executed in the HDD according to the embodiment.

DETAILED DESCRIPTION

According to one embodiment, an information recording device includes a recording medium in which renewal data, which is a target of a data refresh operation, is recorded, a reading module that reads the renewal data recorded in the recording medium, a renewal module that performs updating of a value indicating a state of the data refresh operation, a generation module that generates parity data based on the value and the read renewal data, and a recording module that records the renewal data after recording the generated parity data.

Hereinafter, description of several embodiments is given using the drawings. Note, the present application is not limited to the embodiment, which is described below, and can be embodied by modifying configuration elements within a range without departing from the spirit of the embodiment. Also, various inventions may be made by properly combining some of the configuration elements disclosed in the following embodiment. For example, it is also possible to eliminate one or more of the configuration elements from the configuration elements described in a particular embodiment. Moreover, it is also possible to arbitrarily combine configuration elements applied in multiple embodiments.

Figure 1:
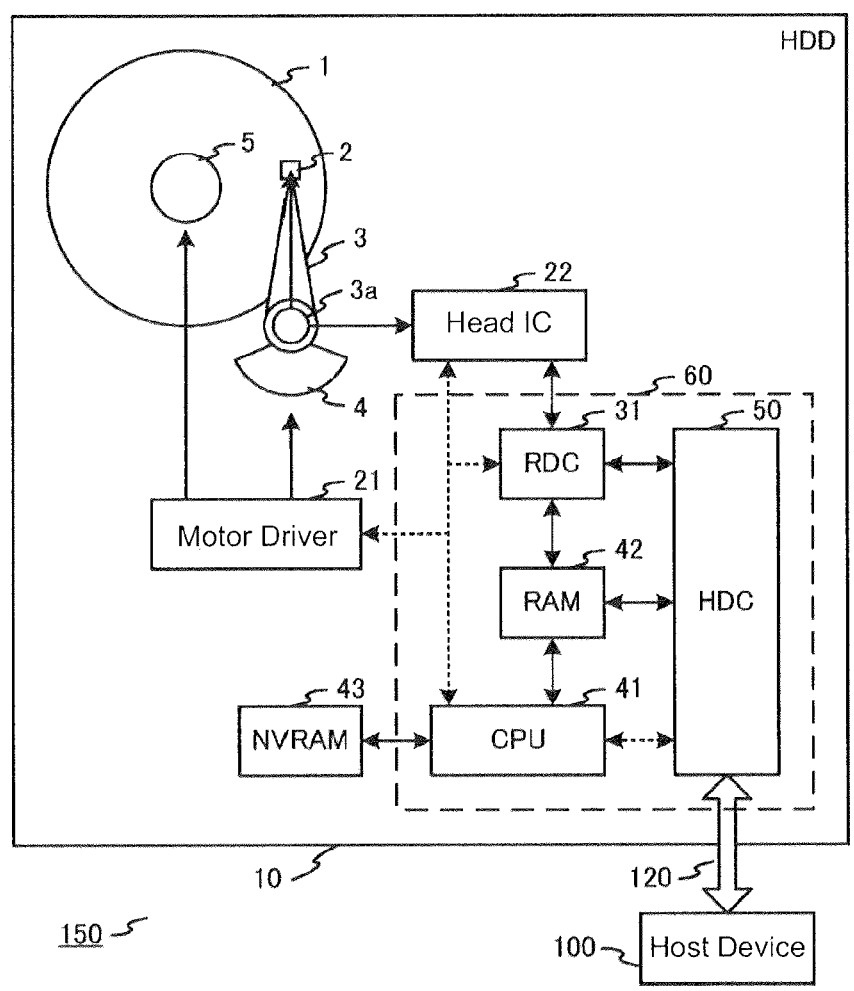
FIG. 1 is a block diagram illustrating a configuration of an electronic apparatus including a magnetic disk drive (HDD) as an information recording device according to an embodiment.

FIG. 1 is a block diagram illustrating a configuration of an electronic apparatus 150 that includes a magnetic disk device (hereinafter, also referred to as a HDD) 10 as an information recording device according to the present embodiment. The electronic apparatus 150 includes a host device 100 and the HDD 10. A host I/F 120 connects the host device 100 with the HDD 10, and is used for transmission/receipt of a command and user data between the host device 100 and the HDD 10. The HDD 10 is connected with the host device 100 via the host I/F 120, and serves as a memory module of the host device 100. For example, the electronic apparatus 150 is a personal computer and a mobile apparatus, and the host device 100 is a chip-set IC provided in a personal computer, etc.

In the embodiment illustrated in FIG. 1, an example of the HDD 10 as an information recording device is explained; however, a configuration of the present embodiment is also applicable to an information recording device that rewrites (renews) information recorded in a recording medium. The information recording device is, for example, a device (SSD, memory card, etc.) using a semiconductor memory as a recording medium, an optical disk drive, an optical magnetic disk drive, etc.

The HDD 10 includes a mechanism including a magnetic disk 1, a slider 2, an arm 3, a voice coil motor (VCM) 4, and spindle motor (SPM) 5, etc. Also, the HDD 10 includes a circuit block including a motor driver 21, a head IC 22, a non volatile RAM (NVRAM) 43, and a controller 60, etc. The controller 60 includes a read-write channel (hereinafter, also referred to as RDC) 31, a CPU 41, a RAM 42, and a hard disc controller (HDC) 50 which is connected to the host device 100 via the host I/F 120.

In the HDD 10 according to the embodiment, information is magnetically recorded in the magnetic disk 1. An information renewal process that rewrites (i.e., renews or refreshes) information is performed to information selected out of the information recorded on the magnetic disk 1 that is determined to be information of which recording quality is not acceptable (reliability of information is lowered). The information renewal control may be generally referred to as a data refresh process. In the information renewal process in the present embodiment, not only user data but also parity data of user data is renewed as recorded information. Because the parity data to be renewed includes predetermined information in the information recording device according to the present embodiment, time required for the data refresh process can be preferably shortened.

The magnetic disk 1 is firmly attached to the SPM 5, and rotates by rotational driving of the SPM 5. At least one surface of the magnetic disk 1 is a recording surface to which information is magnetically recorded. In other words, the magnetic disk 1 is a magnetic recording medium. On the recording surface, a plurality of tracks, which are for example concentric circles, are defined, and each of the tracks includes a servo region and a data region. In the servo region, servo information including positional information indicating physical address on the recording surface of the magnetic disk 1 is recorded. Management information used for a control of the HDD 10 and information transmitted from the host device 100 are recorded in the data region of a predetermined track based on the servo information.

The slider 2 is attached to one end of the arm 3 so as to face the recording surface of the magnetic disk 1. The slider 2 includes a read head (not illustrated) and a write head (not illustrated). The read head (not illustrated) magnetically reads a signal recorded on the recording surface of the magnetic disk 1. The read signal is output to the head IC 22 via a conductor pattern on the arm 3. The write head (not illustrated) performs magnetic recording on the recording surface of the magnetic disk 1 based on a write signal (i.e., write current) input from the head IC 22 via the conductor pattern on the arm 3.

The arm 3 includes the slider 2 on one end and a bearing part 3a on another end. The arm 3 rotates around an approximate center part of the bearing part 3a based on a driving current supplied to the VCM 4, and moves the slider 2 in a radial direction on the recording surface of the magnetic disk 1.

The VCM 4 drives arm rotation based on a driving signal (current) supplied from the motor driver 21 to rotate the arm 3.

The SPM 5 drives disk rotation based on a driving signal (current) supplied from the motor driver 21 to rotate the magnetic disk 1.

The motor driver 21 supplies a driving signal (current) for driving the VCM 4 to the VCM 4 and a driving signal (current) for driving the SPM 5 to the SPM 5 based on a control signal from the controller 60 (more specifically, the CPU 41).

The head IC 22 amplifies a signal input from the read head (not illustrated) attached to the slider 2 via the conductor pattern of the arm 3, and outputs the amplified signal as read information to the controller 60 (more specifically the RDC 31). Also, the head IC 22 outputs a write signal (write current) based on the recording information output from the controller 60 (or the RDC 31) to the write head (not illustrated) attached to the slider 2 via the conductor pattern on the arm 3.

The controller 60 is configured as a system on chip (SoC) including the RDC 31, the CPU 41, the RAM 42, and the HDC 50. In the present embodiment, the controller 60 performs the information renewal process (data refresh process) that rewrites (renews) information recorded in the magnetic disk 1. Note, in some embodiments the controller 60 does not include the RAM 42 and the RAM 42 connects to an external part of the controller 60.

The RDC 31 detects servo information corresponding to a servo region from read information output from the head IC 22, and extracts address information and positional information from the detected servo information. The extracted address information and positional information are output to the CPU 41. Also, the RDC 31 detects information corresponding to a data region from the read information, and decodes the detected information by executing a predetermined process on the detected information. The decoded information is output to the HDC 50. Furthermore, the RDC 31 encodes information input from the HDC 50 to be recorded by executing a predetermined process on the information, and the encoded information is output as recording information to the head IC 22. The RDC 31 uses the RAM 42 as a work memory for the above-described plural processes.

The CPU 41 is a processor that controls each block in the HDD 10 based on a program stored in the NVRAM 43, etc. For example, the CPU 41 controls operations of a positional control process of the read head (not illustrated) with respect to the recording surface of the magnetic disk 1, a rotational control process of the VCM 4 and the SPM 5, and a reproduction recording process of information of the magnetic disk 1. In other words, the CPU 41 controls each block in the HDD 10 based on the predetermined program such that the controller 60 operates as a servo controller or a read-write controller. The CPU 41 uses the RAM 42 for the above-described controls as a work memory. Using the RAM 42, the CPU 41 in the present embodiment manages the information necessary for generating parity data used in the information renewal (data refresh) process. Also, the CPU 41 manages a recording status of information to be recorded in the data region, and controls the data refresh process for improving the recording status. With the data refresh process of the present embodiment, time required for the data refresh process can be advantageously shortened.

The RAM 42 is a work memory of the RDC 31, the CPU 41, and the HDC 50. In the RAM 42, management information related to the data refresh process is temporarily stored. RAM 42, is a volatile memory, such as a DRAM or a SRAM.

The NVRAM 43 is a non volatile memory that memorizes a program that the CPU 41 executes. The program stored in the NVRAM 43 is renewable. Also, the NVRAM 43 is usable as a memory region that memorizes a parameter value used in a plurality of processes that the CPU 41 controls. Management information related to the data refresh process may also be recorded in the NVRAM 43. Also, instead of the NVRAM 43, a part of the data region of the magnetic disk 1 may be used. In the present embodiment, a configuration in which a program and management information are recorded in the NVRAM 43 is explained.

The HDC 50 executes a communication process that transmits/receives information between the HDC 50 and the host device 100. The HDC 50 encodes decoded information transmitted from the RDC 31 by executing a predetermined process on the decoded information, and transmits the decoded information as transmission information to the host device 100. Also, the HDC 50 decodes receipt information received from the host device 100 by executing a predetermined process on the receipt information, and outputs the decoded information to the RDC 31 as information to be recorded. For example, the HDC 50 executes a communication process that conforms to the serial advanced technology attachment (SATA) standard between the HDC 50 and the host device 100. When the HDC 50 receives a write command from the host device 100, the write command includes information of logical address for starting recording of data and recording data length, and the HDC 50 extracts information of the logical address and recording data length from the received write command. The extracted information of the logical address and recording data length is output to the CPU 41.

With such a configuration, the reproduction recording process of information of the recording surface of the magnetic disk 1 is executed in the plurality of blocks in the HDD 10 according to the present embodiment. The reproduction recording process according to the present embodiment includes the data refresh process. In the data refresh process, not only user data but also parity data is reproduced from and recorded in the data region. With the HDD 10 in the present embodiment, time required for the data refresh process is advantageously shortened by recording parity data in addition to user data in the data refresh process.

(Data Refresh Process)

Figure 2:
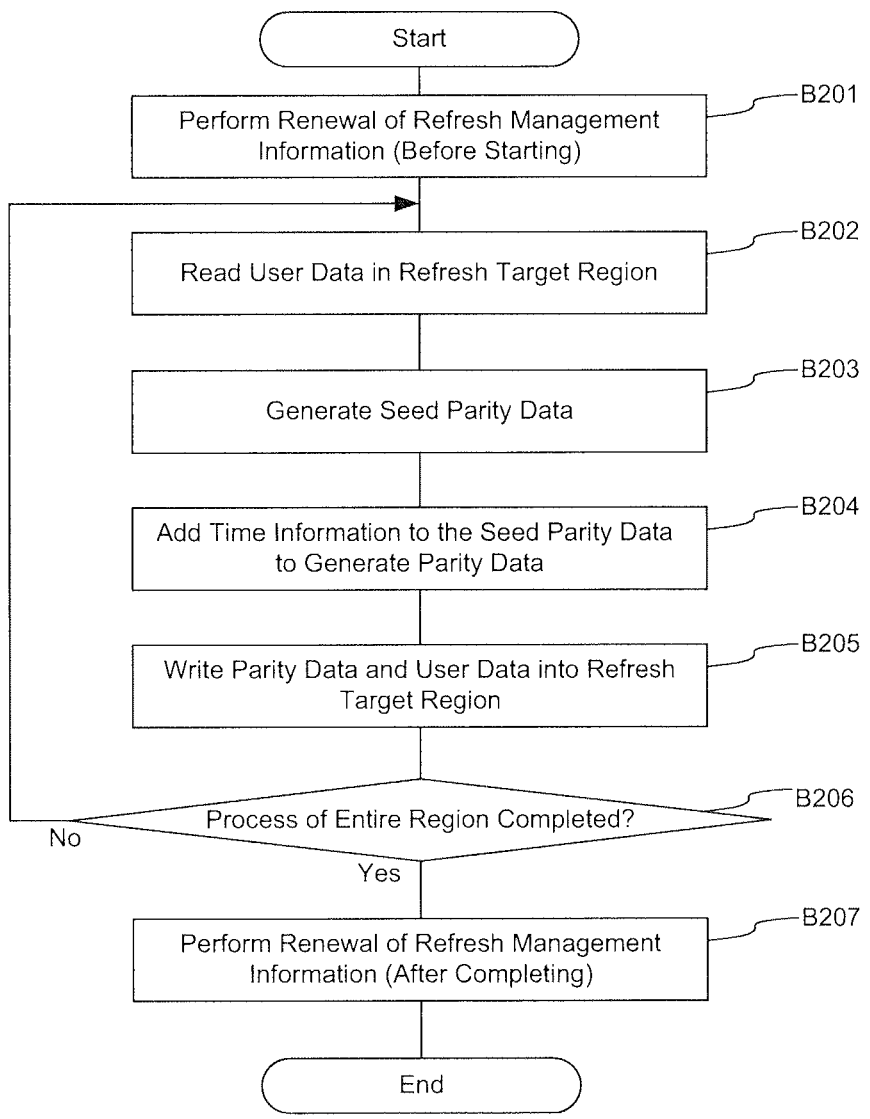
FIG. 2 is a flow diagram for explaining an operation of a data refresh process executed in the HDD according to the embodiment.

Next, using FIG. 2 and FIGS. 3A and 3B, an operation of the data refresh process executed in the HDD 10 according to the present embodiment is explained.

FIG. 2 is a flow diagram for explaining an operation of the data refresh process executed in the HDD 10 according to the present embodiment. FIGS. 3A and 3B are drawings for explaining management information related to the data refresh process according to the present embodiment.

Management information related to the data refresh process according to the present embodiment includes information with which it is possible to identify whether data stored on the magnetic disk 1 was stored before starting a data refresh process or after starting the data refresh process (whether it is in a state before starting or in a state after starting). In the data refresh process, parity data is generated based on read user data and on information with which it is possible to identify whether data stored on the magnetic disk 1 has been stored before starting the data refresh process or after starting the data refresh process. With the generated parity data, time required for the data refresh process can be advantageously shortened in the HDD 10 according to the present embodiment.

In response to a request to start the data refresh process, the CPU 41 updates management information (hereinafter, referred to as refresh management information) related to the data refresh process (B201). The refresh management information at this point includes information for specifying a track to be a refresh target or a track group including a plurality of tracks, and time information with which it is possible to specify whether or not it is a state before starting the data refresh process. The time information may be accumulated operation time of the HDD 10 or information that shows present time; but, not limited to these. The refresh management information is stored in the RAM 42 during an operation of the HDD 10, and the refresh management information is stored in a non volatile memory region (for example, the recording surface of the magnetic disk 1, the NVRAM 43, etc.) in case the HDD 10 unexpectedly shuts down. The request to start the data refresh process includes, for example, a request from the host device 100 and a voluntary request based on a process executed in the HDD 10; however, such a request is not limited to these.

FIG. 3A is a drawing for explaining refresh management information that is renewed before starting the data refresh process according to the present embodiment. In the refresh management information illustrated in FIG. 3A, a number "AAA" given to a track group to be a target of the data refresh process is registered. The track group includes a plurality of tracks and is a unit to execute the data refresh process. Also, as the time information, "###1", which is information of 4 (Byte) length, is registered. For example, when the time information is a counter that adds 1 (bit) at every 100 (msec), because 4 (Byte) is 32 (bit) (8 (bit)×4=32 (bit)), time information of 4 (Byte) length can count 429, 496,729.6 (sec) (100 (msec)×2^32=429, 496,729.6 (sec)). In other words, the 4-byte time information provides a unique value for up to 13.6 or more years, and thereby the time information of 4 (byte) can be used as data specifying when the refresh process is executed.

The controller 60 operates as a read-write controller and reads a predetermined unit of user data recorded in a region that is a refresh target (B202). The read user data is stored in the RAM 42. The HDC 50 generates seed parity data that is original data that eventually becomes parity data based on the user data (B203). Generally, the seed parity data is data having a size, such as (512 (Byte) and 4k (Byte)), that is the same as a sector size of a management unit of the user data that is being refreshed. In some embodiments, seed parity data is generated by performing an XOR operation on corresponding bits of two adjacent data management units of the user data that is being refreshed.

Next, the HDC 50 generates parity data by embedding time information used as "data to specify time to execute the refresh process" in the seed parity data. The refresh management information can be used to manage the time information (B204). The parity data may be protected by a CRC (cyclical redundancy check). Embedding time information means, for example, renewing bits of a predetermined position of the seed parity data (for example, the first 16 bits) with a value that is generated by performing an XOR operation on each bit of the time information with a corresponding bit (for example, the first 16 bits) of the parity data. In another embodiment, the value is generated by continuously recording the seed parity data and the time information.

After reading the user data from the refresh target region, the controller 60 records the parity data in this region prior to recording the user data that is the renewal target, and records the user data that is the renewal target successively after recording the parity data (B205). The CPU 41 determines whether or not the data refresh process of an entire region of the target section has been completed (B206). When the process of the entire region has not been completed (No in B206), a process from (B202) through (B205) is executed again.

When the data refresh process of the entire region of the target section has been completed (Yes in B206), the CPU 41 performs renewal of the refresh management information (B207), and the data refresh process ends. The refresh management information at this point includes information for specifying a track to be a refresh target or a track group including a plurality of tracks, and time information. The time information specifies whether or not data stored in a particular management unit of the user data has been written after the data refresh process has been completed. For example, the time information is preferably a value that indicates whether or not the data refresh process has been completed, such as all "0" or all "1"; but not limited to this.

FIG. 3B is a drawing for explaining refresh management information that is renewed after completing the data refresh process according to the present embodiment. In the refresh management information illustrated in FIG. 3B, the number "AAA" given to the track group to be the target of the data refresh process is maintained without being renewed. Also, as time information, information of all "0" having 4 (Byte) length, which is "0000", is registered. With the refresh management information illustrated in FIG. 3B, it is possible to specify that the data refresh process has been properly completed in the track group "AAA".

As described above, the CPU 41 and the controller 60 execute the data refresh process according to the present embodiment. In such data refresh process, the refresh management information is used, and includes information with which it is possible to identify whether data stored on magnetic disk 1 has been written is before starting the data refresh process or after starting data refresh process. Also, prior to renewing the user data in the data refresh process, the parity data based on the refresh management information is recorded. In other words, with the above-described characteristic configuration, time required for the data refresh process can be advantageously shortened in the HDD 10 according to the present embodiment.

(Resume Process of Stopped Data Refresh Process)

Next, using FIG. 4, an operation of a resume process of the stopped data refresh process, which is executed in the HDD 10 according to the present embodiment, is explained. FIG. 4 is a flow diagram for explaining an operation of the resume process of the stopped data refresh process executed in the HDD 10 according to the present embodiment.

As described above, the management information related to the data refresh process according to the present embodiment includes information for identifying whether it is before starting the data refresh process or after starting the data refresh process. Therefore, with the HDD 10 according to the present embodiment, it is possible to specify whether or not the data refresh process has been properly completed. Also, even when it is specified that the data refresh process has not been completed, it is possible to resume the data refresh process. Reasons why the data refresh process may not be completed include loss of power source for the HDD 10 during the data refresh process and transmission of a read or write request from the host device 100 that is prioritized during the data refresh process.

In response to a request to resume the data refresh process, the CPU 41 reads the refresh management information (B401), and determines whether or not time information of the read refresh management information corresponds to information indicating "after completing the process" (i.e., whether or not the data refresh process has been completed) (B402). When it is determined that the data refresh process has been completed (Yes in B402), a resume process of the stopped data refresh process of a track group corresponding to the time information ends without executing an actual operation.

On the other hand, when it is determined that the data refresh process has not been completed (No in B402), the controller 60 operates as the read write controller and reads all parity data recorded in the region in the corresponding track group from the top of the track group (B403). When time information extracted from the read parity data does not correspond to time information in the refresh management information, or when all extracted time information for each management unit of the refreshed user data correspond to each other, the last track that includes parity data that corresponds to the time information in the refresh management information is determined to be an interrupted track in the middle of the data refresh process (B404). Then, the controller 60 attempts to read the user data recorded in the track determined as have been interrupted (B405).

It is then determined whether the user data that has been attempted to be read is readable (B406). Whether said data is readable or not is determined by whether or not a read error has occurred. When it is determined that a specific sector of the read user data (i.e., one of the management units of the refreshed user data) is unreadable (No in B406), the controller 60 reads another sector. Note, because an error sector that becomes a read error due to power-down during writing is generally one sector or less, data in sectors other than the one error sector are readable. The HDC 50 restores the seed parity data from parity data and time information that are confirmed to correspond to the time information in the refresh management information, and restores the user data on which the read error has occurred from the restored seed parity data and data in other sectors other than the error sector (B407). When it is determined that all sectors of user data attempted to be read are readable (Yes in B406), a block to correct the user data (B407) is not executed.

Parity data and user data that are appropriate to rewrite (renew) are then prepared, and the controller 60 restarts the data refresh process again to a portion of the targeted user data that needs rewriting (renewing) (B408). The CPU 41 determines whether or not a restore process of the data refresh process to an entire region of the target section has been completed (B409). When the process to the entire region has not been completed (No in B409), a process from (B405) through (B408) is executed again.

When the data refresh process of the entire region of the target section has been completed (Yes in B409), the CPU 41 performs renewal of the refresh management information (B410), and the restore process of the data refresh process ends. The refresh management information at this point also includes time information for specifying whether or not it is after the data refresh process has been completed. For example, the time information is preferably a value that is the same as a value clearly specifying whether or not the data refresh process has been completed, such as all "0" or all "1."

As described above, the CPU 41 and the controller 60 execute the restore process of the data refresh process according to the present embodiment. By the above-described restore process, the data refresh process of a region where improper parity data is recorded is executed. The region where improper parity data is recorded and regions subsequent to this region are regions in which the data refresh process is needed to restore because the data refresh process has been stopped. In other words, in the HDD 10 according to the present embodiment, even when the data refresh process is stopped, the above-described characteristic configuration allows the data refresh process of the target region to be restarted, and time required for the restarted data refresh process can be advantageously shortened.

According to the above-explained present embodiment, a plurality of blocks including the CPU 41 and the controller 60 execute the data refresh process. In the data refresh process, the controller 60 generates parity data based on the refresh management information managed by the CPU 41, and the generated parity data and user data to be renewed are recorded. Also, by recording the generated parity data prior to the user data, the restore process of the data refresh process can be executed.

In the data refresh process of the present embodiment, as a conventionally known data refresh process is performed, an operation to temporarily rewrite read data to another non-volatile recording region becomes unnecessary. Therefore, time to seek a head and to position the head after seeking, which is accompanied with the process, can be omitted, and also noise occurrence due to the seeking can be suppressed. Also, because renewal of the management information for data refresh is performed only two times, which is before starting the process and after starting the process, it is possible to shorten the process time as compared to a conventional method in which, for example, renewal of management information is performed after refreshing one track. Also, according to the present embodiment, it becomes possible to provide an information recording device and an information recording method with which time required for the data refresh process is properly shortened.

Note, in the present embodiment, an example in which parity data is added to a specific unit of user data has been shown. However, a unit to which parity data is added may be, for example, one track, a plurality of tracks, one track group, a region made by dividing the recording region of the HDD 10 into a plurality of regions, or an entire recording region of the HDD 10. When parity data is added to a region including a plurality of tracks, not only time information but also information indicating a target region may be used for generating the parity data. By doing so, it is possible to specify a target range of the track refresh process from the read parity data.

While certain embodiments have been described, these embodiments have been presented by way of example only; and are not intended to limit the scope of the inventions. Indeed, the novel embodiments described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirits of the inventions.

What is claimed is:

1. An information recording device, comprising:
a recording medium in which renewal data that is a target of a data refresh operation is recorded; and
a controller including a recording module configured to record the renewal data on the recording medium after recording parity data on the recording medium, the parity data being generated from a value indicating a state of the data refresh operation and the renewal data.

2. The information recording device according to claim 1, wherein the controller further includes:
a generation module configured to generate seed parity data from the renewal data, and to generate the parity data based on the seed parity data and the value.

3. The information recording device according to claim 1, wherein the controller further includes:
a renewal module configured to update the value indicating the state of the data refresh operation before the data refresh operation is performed.

4. The information recording device according to claim 3, wherein the value indicating the state of the data refresh operation before the data refresh operation is performed is a time value.

5. The information recording device according to claim 3, wherein the renewal module is further configured to update the value indicating the state of the data refresh operation after the data refresh operation is performed.

6. The information recording device according to claim 5, wherein the value indicating the state of the data refresh operation after the data refresh operation is performed is a predetermined value.

7. The information recording device according to claim 6, wherein the predetermined value is a zero value.

8. The information recording device according to claim 1, wherein the controller further includes:
a determination module configured to determine whether or not the data refresh operation has been interrupted based on the value indicating the state of the data refresh operation; and wherein
the recording module is configured to resume the data refresh operation when the determination module has determined that the data refresh operation has been interrupted.

9. The information recording device according to claim 8, wherein the controller further includes:
a specification module configured to specify a point where the data refresh operation has been interrupted,
wherein the recording module is configured to resume the data refresh operation from the interrupted point.

10. A method of refreshing recorded data by an information recording device in a target region of a recording medium of the information recording device, comprising:
(a) updating a state value indicating a beginning of a data refresh operation;
(b) reading a block of data recorded in the target region of the recording medium;
(c) generating parity data from the block of data and the state value;
(d) recording the parity data in the recording medium and then the block of data; and
(e) updating the state value indicating an end of the data refresh operation.

11. The method of claim 10, wherein the block of data corresponds to a track of data and the target region includes multiple tracks of data.

12. The method of claim 11, wherein the state value indicating the beginning of the data refresh operation is a time value.

13. The method of claim 12, wherein the state value indicating the end of the data refresh operation is a predetermined value.

14. The method of claim 13, wherein the predetermined value is a zero value.

15. A method of refreshing recorded data by an information recording device in a target region of a recording medium of the information recording device, comprising:
(a) reading a state value associated with the target region of the recording medium indicating whether or not a data refresh operation has been interrupted for the target region, wherein the target region includes multiple blocks of data and each of the blocks of data has parity data associated therewith;
(b) determining that the data refresh operation has been interrupted for the target region based on the state value;
(c) reading the parity data associated with the blocks of data in the target region and determining a location of interruption of the data refresh operation by comparing values extracted from the parity data; and
(d) resuming the data refresh operation for the target region based on the location of interruption.

16. The method of claim 15, wherein the data refresh operation for the target region is resumed beginning with a block of data that is recorded directly before the location of interruption.

17. The method of claim 15, wherein the data refresh operation for the target region is resumed for a block of data for which the data refresh operation has been interrupted by:
reading the block of data; and
recording the parity data associated with the block of data in the recording medium and then the block of data.

18. The method of claim 17, wherein the block of data is restored from the parity data associated with the block of data if the block of data is not readable.

19. The method of claim 15, wherein
the blocks of data include first and second blocks of data that are recorded in that order during the data refresh operation, and the values extracted from the parity data include first and second values extracted from the parity data associated with the first and second blocks of data, respectively, and
the first and second values are encoded time values.

20. The method of claim 19, wherein the location of interruption of the data refresh operation is determined to be the first block of the data if the first and second values are not equal.

* * * * *